US012220832B2

(12) United States Patent
Kumar et al.

(10) Patent No.: US 12,220,832 B2
(45) Date of Patent: Feb. 11, 2025

(54) INTEGRATED HIGH-PRESSURE HYDRO-JETTING CUTTING TOOL TO CUT MASTER VALVE GATE

(71) Applicant: SAUDI ARABIAN OIL COMPANY, Dhahran (SA)

(72) Inventors: Sanjiv Kumar, Udhailiyah (SA); Muhammad Imran Javed, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 407 days.

(21) Appl. No.: 17/652,391

(22) Filed: Feb. 24, 2022

(65) Prior Publication Data

US 2023/0264380 A1 Aug. 24, 2023

(51) Int. Cl.
*E21B 29/00* (2006.01)
*B26F 3/00* (2006.01)

(52) U.S. Cl.
CPC .............. *B26F 3/004* (2013.01); *E21B 29/00* (2013.01)

(58) Field of Classification Search
CPC .......... E21B 34/02; E21B 29/00; E21B 29/06; E21B 31/20; B26F 3/004; B26F 3/007
See application file for complete search history.

(56) References Cited

U.S. PATENT DOCUMENTS 4,534,427 A * 8/1985 Wang ........................ B24C 1/04 175/70
11,708,736 B1 * 7/2023 Mukhles ................. E21B 29/08 166/55.1
2012/0074110 A1 * 3/2012 Zediker ................... E21B 10/60 219/121.72
2014/0090846 A1 * 4/2014 Deutch ................... E21B 33/13 166/376

(Continued)

FOREIGN PATENT DOCUMENTS

WO 2014/039977 A2 3/2014

OTHER PUBLICATIONS

Ai Araimi, Nasser Mubarak et al., "Pioneering "Gate Valve Milling" Operation Performed With Coiled Tubing Recovers an Important Oil Producer Offshore Brunei"; Proceedings of the 2005 SPE Annual Technical Conference and Exhibition; Paper No. SPE-96685-MS; pp. 1-7; Oct. 9, 2005 (7 pages).

(Continued)

*Primary Examiner* — Carib A Oquendo
(74) *Attorney, Agent, or Firm* — Osha Bergman Watanabe & Burton LLP

(57) ABSTRACT

A system includes a rod, a nozzle, a camera, and a pressure control system. The rod has a conduit extending along a rod axis. The rod is disposed adjacent to the barrier within the orifice. The nozzle is connected to the rod and is in hydraulic communication with the conduit and the orifice. The camera is also connected to the rod. The nozzle and the camera are (Continued)

configured to protrude from the rod and rotate about the rod axis. The pressure control system is connected to the tubular body and is disposed around the rod. The nozzle is configured to cut away the portion of the barrier upon pumping of a cutting fluid through a conduit of the rod and out of the nozzle towards the barrier. The portion of the barrier is removable from the orifice of the tubular body once cut away.

20 Claims, 5 Drawing Sheets

(56) References Cited

U.S. PATENT DOCUMENTS

2023/0407722 A1 * 12/2023 Javed ...................... E21B 29/02

OTHER PUBLICATIONS

Al-Buhassan, Shaker et al., "Case History: Innovative Milling Operation of Stuck Wellhead Tubing Master Valve using Coiled Tubing at South Ghawar Field, Saudi Arabia"; Proceedings of the SPE Middle East Oil and Gas Show and Conference; Paper No. SPE-164415-MS; pp. 1-12; Mar. 10, 2013 (12 pages).

Al-Ajmi, Mohammed D. et al., "Electric-Line Milling Operation on Tree Master Valve of a High Surface Pressure Well Enables Well Control"; Proceedings of the SPE/ICoTA Coiled Tubing and Well Intervention Conference and Exhibition; Paper No. SPE-184776-MS; pp. 1-19; Mar. 21, 2017 (19 pages).

* cited by examiner

INTEGRATED HIGH-PRESSURE HYDRO-JETTING CUTTING TOOL TO CUT MASTER VALVE GATE

BACKGROUND

Hydrocarbons are located in porous formations far beneath the Earth's surface. Wells are drilled into these formations to access and produce the hydrocarbons. After the well is drilled and completed, a production tree caps the well at the surface of the Earth. Production trees comprise a plurality of valves that are used to contain the well pressure and controllably produce the hydrocarbons. Over the life of the well, one of the primary pressure control valves in the production tree may fail to open and the production tree must be replaced.

Replacing a production tree requires removal of the primary pressure control barrier, i.e., the production tree valves. Thus, a kill fluid must be pumped into the well to act as the primary pressure control barrier prior to removal of the production tree. However, when one of the primary pressure control valves are unable to open, the kill fluid is unable to be pumped into the well. Thus, the broken valve must be drilled/milled through to access the well and pump the kill fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, methods and systems for removing a portion of a barrier disposed within an orifice. The orifice is defined by an inner wall of a tubular body. The system includes a rod, a nozzle, a camera, and a pressure control system. The rod has a conduit extending along a rod axis from a first end of the rod to a second end of the rod. The second end of the rod is disposed adjacent to the barrier within the orifice. The nozzle is connected to the second end of the rod and is in hydraulic communication with the conduit and the orifice. The camera is connected to the second end of the rod. The nozzle and the camera are configured to protrude from the rod and rotate about the rod axis. The pressure control system is connected to the tubular body and is disposed around the rod. The nozzle is configured to cut away the portion of the barrier upon pumping of a cutting fluid through a conduit of the rod and out of the nozzle towards the barrier. The portion of the barrier is removable from the orifice of the tubular body once cut away.

The method includes connecting a jetting tool, having a rod, and a pressure control system, having a pressure control body, to the tubular body. The rod is disposed within the pressure control body and has a nozzle and a camera. The method further includes positioning the rod into the orifice of the tubular body until the camera and the nozzle are disposed adjacent to the barrier, activating the jetting tool, cutting away the portion of the barrier by pumping a cutting fluid through a conduit of the rod and out of the nozzle towards the barrier, and removing the portion of the barrier from the orifice of the tubular body.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
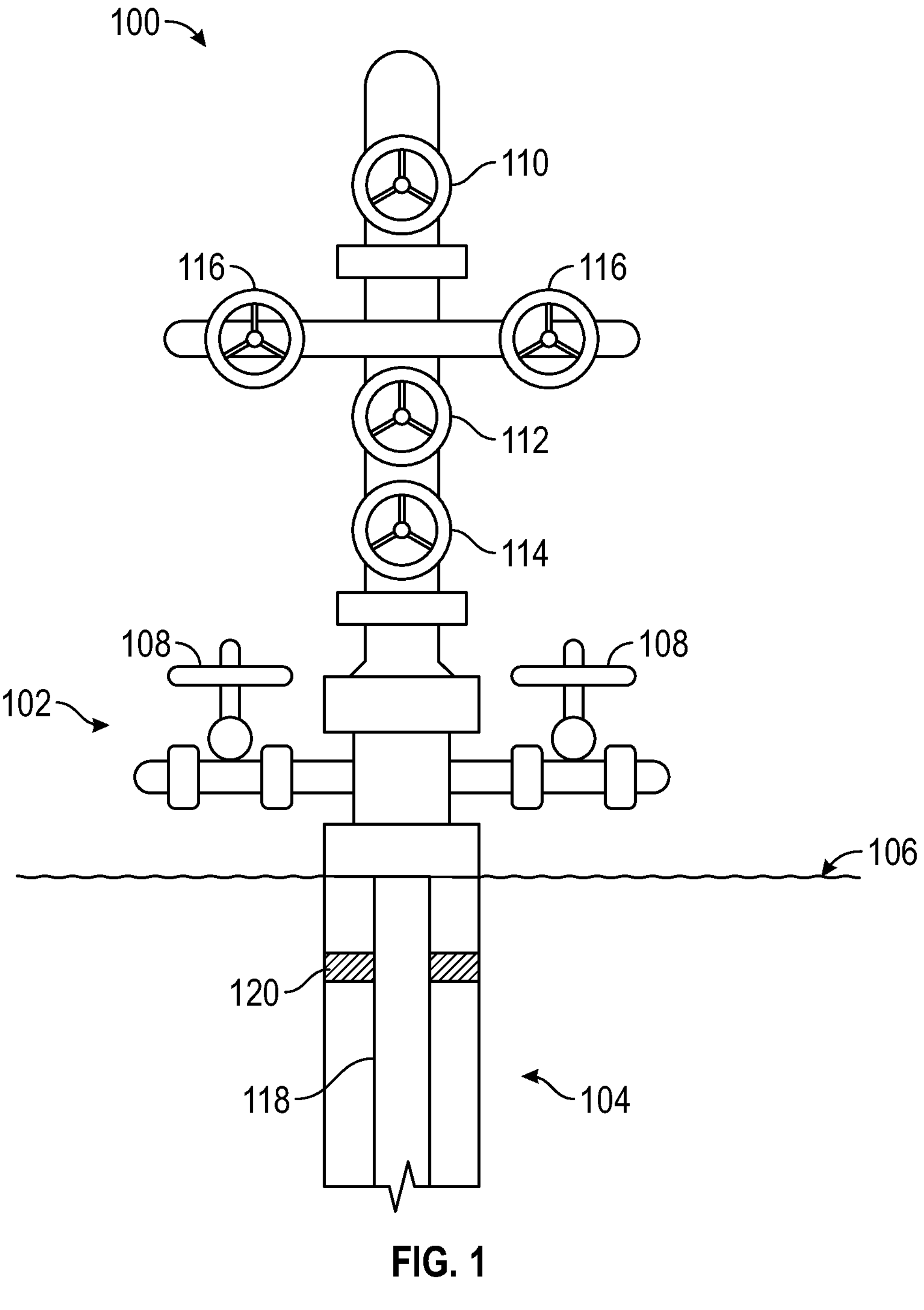
FIG. 1 shows a production tree in accordance with one or more embodiments.

FIG. 1 shows a production tree (100) in accordance with one or more embodiments. The particular structure shown is for illustration purposes only; the scope of this disclosure is intended to encompass any type of production tree (100). In general, a production tree (100), also known as a Christmas tree, is installed on top of a wellhead (102). The production tree (100) and the wellhead (102) cap a well (104) at a surface location (106). The well (104) may have any wellbore geometry and structure without departing from the scope of the disclosure herein. The surface location (106) may be any location along the surface of the Earth. For example, and in accordance with one or more embodiments, the production tree (100) may be located in a subsea application and the surface location (106) may be the ocean floor.

A well (104) is a hole drilled into the surface of the Earth commonly used to access and produce formation fluids such as hydrocarbons or water. A well (104) is structurally supported by one or more casing strings, not pictured. The wellhead (102) is made of a plurality of spools and wellhead valves (108). The surface-extending portion of each casing string is housed in the wellhead (102). The casing string(s) extend from the wellhead (102) into the hole and are cemented in place.

In accordance with one or more embodiments, a tubing head (not pictured), housing the surface-extending portion of production tubing (118), may be located between the wellhead (102) and the production tree (100). The production tubing (118) is located within the inner-most casing string and is often set in tandem with a packer (120). The production tubing (118) provides a conduit from production fluids to flow downhole to the surface location (106). The packer (120) seals the tubing-casing annulus and forces the production fluids to flow into the production tubing (118). The well (104) may have other completion designs and may include other pieces of equipment, such as artificial lift equipment or liners, without departing from the scope of the disclosure herein.

The wellhead valves (108) provide access to the annuli located between casing strings or between a casing string and the wellbore wall. The wellhead valves (108) may be any valve known in the art, such as a gate valve. When a well (104) does not have a packer (120) and production tubing (118), a kill fluid is able to be pumped through the wellhead valve (108) that corresponds with the inner-most casing string to kill the well (104). However, when a well (104) has a packer (120) and production tubing (118), the well (104) cannot be killed in this manner as the kill fluid would gather on top of the packer (120) and production fluids would still be able to flow to the surface location (106) through the production tubing (118).

The production tree (100) is also made of a plurality of spools and valves. The production tree (100) valves may also be any valve known in the art, such as a gate valve. Often the production tree (100) is formed in a T-shape as shown in FIG. 1. The production tree (100), depicted in FIG. 1, has a crown valve (110), an upper master valve (112), a lower master valve (114), and two wing valves (116). However, the production tree (100) may have any combination of valves without departing from the scope of the disclosure herein.

The lower master valve (114) is a gate valve and may be used to limit the amount of flow into the production tree (100) from the wellhead (102). In most cases, it is manually actuated and kept in a restricted, partially open position during production of formation fluids. The upper master valve (112) is a failsafe measure in case the lower master valve (114) fails or if maintenance on the production tree (100) must be performed. The upper master valve (112) is often a remotely actuated gate valve and may be automatically shut to prevent all flow from the wellhead (102) to the production tree (100) when a signal is sent.

One of the wing valves (116) may be a kill wing valve (116). The kill wing valve (116) may be a manual gate valve that is the connection point for injection into the well (104). Fluid such as kill fluid, corrosion inhibitors, methanol, dehydration formulas, etc. may be injected into the well (104) via this valve. The wing valves (116) may also be known as side-arm valves or secondary wing valves.

The other wing valve (116) may be a production wing valve (116), often located 180 degrees from the kill wing valve (116), as shown in FIG. 1. The production wing valve (116) may be an automatically actuated gate valve that requires positive hydraulic pressure to remain open. The production wing valve (116) may also be used to prevent flow from the well (104) under emergencies or during maintenance. The crown valve (110) provides direct vertical access to the well (104) for well interventions and may be a manually operated gate valve.

Production trees (100) typically operate for as long as the well (104) produces fluids, however, production trees (100) often require maintenance during the life of the well (104). Maintenance on production trees (100) capping a well (104) having a packer (120) and production tubing (118) is challenging when one of the lower valves (i.e., the lower master valve (114)) get stuck in a closed position. When this situation arises, any well intervention work is obstructed because a kill fluid is unable to be pumped into the well (104).

In such situations, the only available option is to drill or mill out the valve using metallic drill bits. However, these milling operations are unsafe and pose the risk of getting stuck. As such, the present disclosure outlines alternative methods and systems for removing the damaged valve. The methods and systems include using a high-pressure hydro-jet to cut and remove the gate-portion of the stuck valve. While the present disclosure specifies using this technology in a production tree (100) to cut a gate valve, the technology can be used in any body having an obstruction without departing from the scope of the disclosure herein.

Figure 2A:
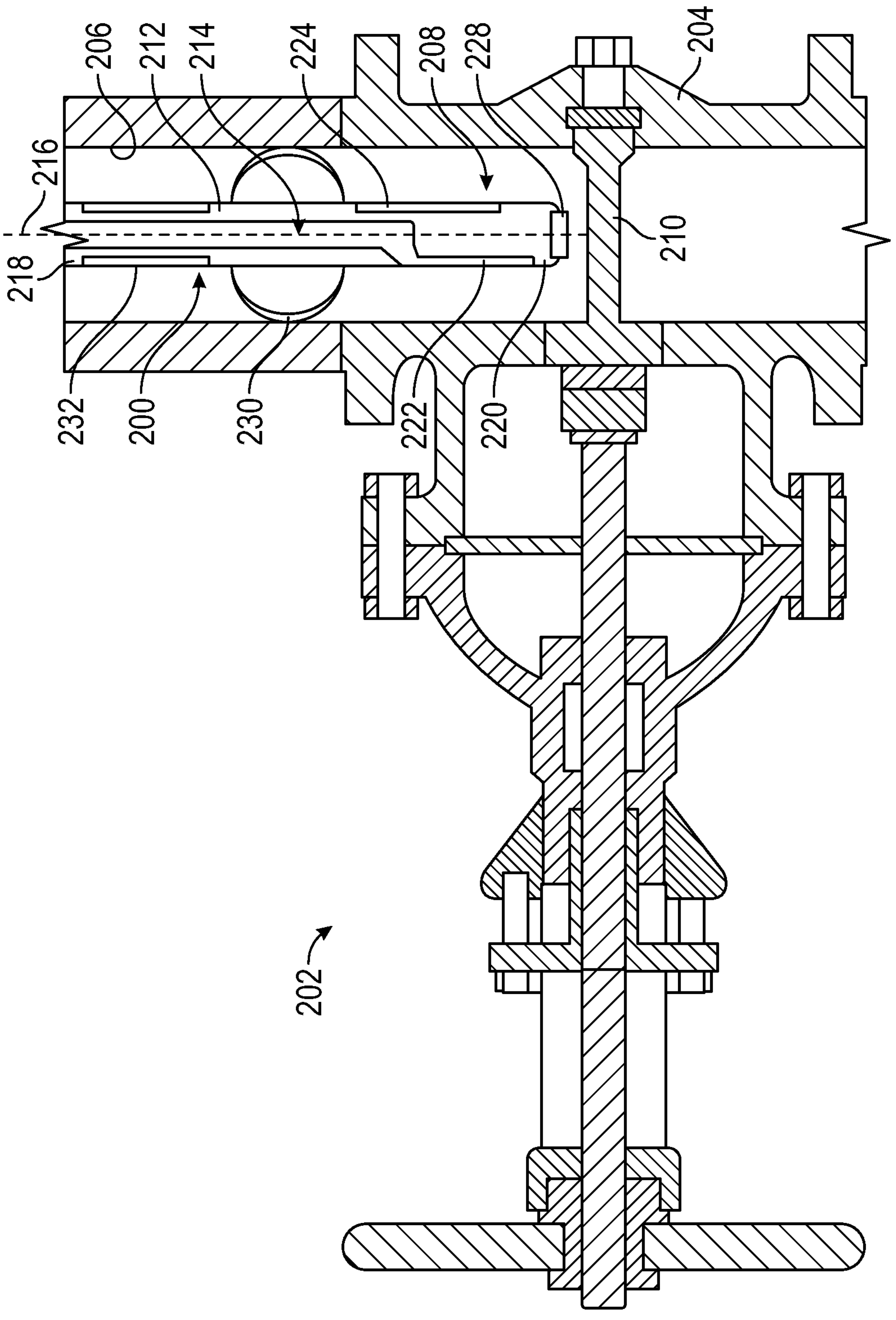
FIGS. 2*a* and 2*b* show a high-pressure hydro-jetting cutting tool deployed in a tubular body of a valve in accordance with one or more embodiments.
Figure 2B:
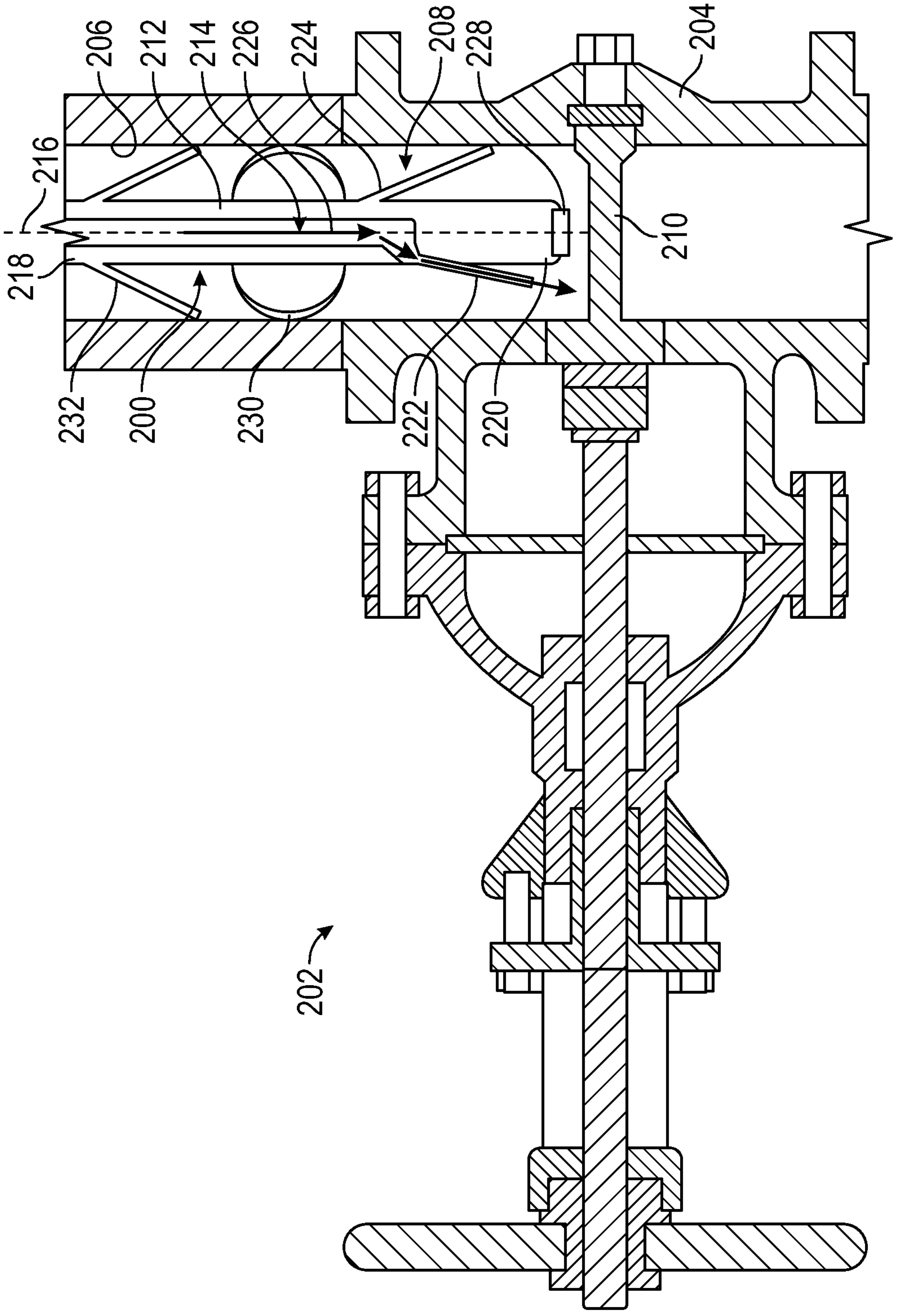

FIGS. 2*a* and 2*b* show a high-pressure hydro-jetting cutting tool (200), herein called "tool (200)" or "jetting tool (200)," deployed in a tubular body (204) of a stuck valve (202) in accordance with one or more embodiments. Specifically, FIG. 2*a* shows the tool (200) in a retracted position and FIG. 2*b* shows the tool (200) in a deployed position. In accordance with one or more embodiments, the stuck valve (202) may be a lower master valve (114), or an upper master valve (112), located on a production tree (100) as described in FIG. 1. Components shown in FIGS. 2*a* and 2*b* that are the same as or similar to components described in FIG. 1 have not been redescribed for purposes of readability and have the same function and description as outlined above.

The stuck valve (202) has a tubular body (204). In accordance with one or more embodiments, the tubular body (204) may be formed by the stuck valve (202) along with other spools and valves of the production tree (100) that are connected to the stuck valve (202). The tubular body (204) has an inner wall (206) defining an orifice (208). The stuck valve (202) is shown in a closed position meaning that a barrier (210) is disposed within the orifice (208) and the barrier (210) is completely or partially blocking the orifice (208). In accordance with one or more embodiments, the stuck valve (202) is a gate valve, and the barrier (210) is the gate-portion of the stuck valve (202).

The tool (200) is made of a rod (212) having a conduit (214) extending along a rod axis (216) from a first end (218) of the rod (212) to a second end (220) of the rod (212). The second end (220) of the rod (212) is disposed adjacent to the barrier (210) within the orifice (208) of the tubular body (204). The rod (212) may be a singularly machined tubular, or the rod (212) may be made out of a plurality of tubulars having different components. The tubulars are threaded, or otherwise connected, together. In accordance with one or more embodiments, the rod (212) may include a fiber optic cable, not pictured, either embedded in the body of the rod (212) or running through the conduit (214) of the rod (212). The fiber optic cable is connected to a computer, not pictured, at the surface location (106). The fiber optic cable may be used to send and receive signals from the various components of the tool (200).

A nozzle (222) and a camera (224) are connected to the second end (220) of the rod (212). In FIG. 2*a*, the nozzle (222) and the camera (224) are shown in the retracted position meaning that the nozzle (222) and the camera (224) are flush, or close to flush, with the rod (212). In FIG. 2*b*, the nozzle (222) and the camera (224) are shown in the deployed position meaning that the nozzle (222) and the camera (224) protrude from the rod (212).

In accordance with one or more embodiments, the nozzle (222) and the camera (224) are designed to protrude from the rod (212) such that the outlet of the nozzle (222) and the lens of the camera (224) are directed towards the barrier (210). A command may be sent from the computer to the nozzle (222) and camera (224), using the fiber optic cable, to protrude them from the rod (212). Further, the camera (224) is able to send live images and video to the computer using the fiber optic cable. In further embodiments, the nozzle (222) is hydraulically connected to both the conduit (214) and the orifice (208). The nozzle (222) may be designed to emit a fluid, such as a water, at a high-pressure from the conduit (214) into the orifice (208). The flow path (226) of the fluid is shown in FIG. 2*b*. In accordance with one or more embodiments, the pressure of the fluid exiting the nozzle (222) is strong enough to cut through the barrier (210).

The nozzle (222) and the camera (224), while in the deployed position, may rotate about the rod axis (216). Due to the rotation and deployment of the nozzle (222), the high-pressure fluid exiting the nozzle (222) may completely cut away a portion of the barrier (210). In accordance with one or more embodiments, a magnet (228) is connected to the second end (220) of the rod (212). The barrier (210) may be made out of a metal and the cut portion of the barrier (210) may be attracted to the magnet (228) such that the tool (200) may pull the cut portion of the barrier (210) out of the orifice (208) of the tubular body (204).

A centralizer (230) is disposed around the rod (212). The centralizer (230) touches the inner wall (206) of the tubular body (204) to hold the rod (212) in a central position within the orifice (208) as shown in FIGS. 2*a* and 2*b*. The centralizer (230) may have a similar design to a casing centralizer. For example, the centralizer (230) may be fit with two hinged collars and multiple bow springs may extend from one collar to the other. Further, there may be more than one centralizer (230) disposed around the rod (212), and each centralizer (230) may be located anywhere along the rod (212).

An anchor (232) is connected to the rod (212) and also has a retracted position and deployed position similar to the nozzle (222) and the camera (224). The anchor (232) is designed to prevent the tool (200) from moving up hole while the fluid exits the nozzle (222) and cuts away the barrier (210). FIG. 2*a* shows the anchor (232) in the retracted position and FIG. 2*b* shows the anchor (232) in the deployed position. In accordance with one or more embodiments, the deployed position occurs when the anchor (232) protrudes from the rod (212) and grips, or bites into, the inner wall (206) of the tubular body (204). The anchor (232) may have slips, or serrated edges, to enable the anchor (232) to grip the inner wall (206) and prevent up hole movement caused by high-pressure emission of fluid out of the nozzle (222).

Figure 3:
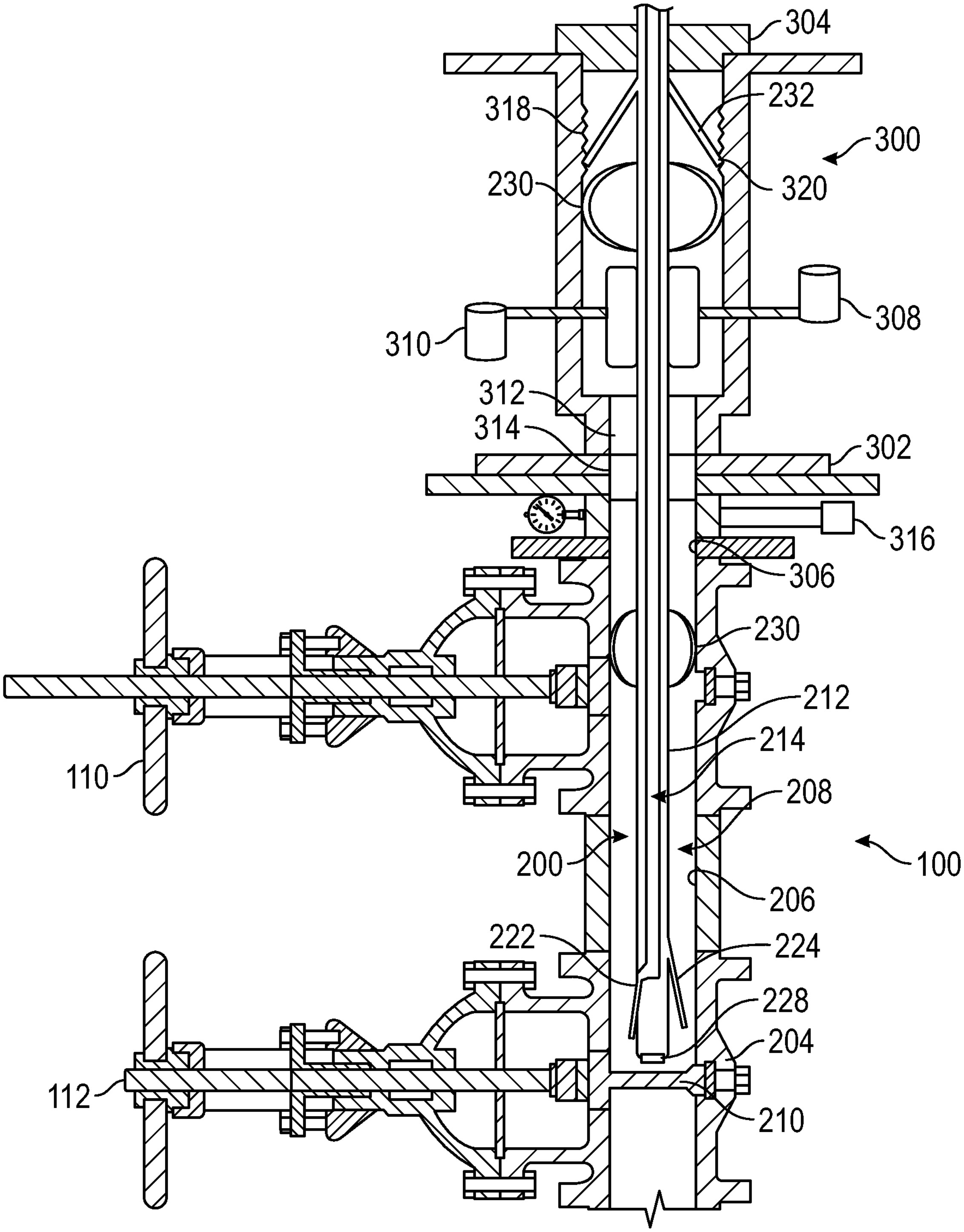
FIG. 3 shows the high-pressure hydro-jetting cutting tool with a pressure control system deployed in the production tree in accordance with one or more embodiments.

FIG. 3 shows the tool (200) with a pressure control system (300) deployed in a production tree (100) in accordance with one or more embodiments. Components shown in FIG. 3 that are the same as or similar to components described in FIGS. 1-2*b* have not been described for purposes of readability and have the same description and function as outlined above. Specifically, the tool (200) is deployed in the tubular body (204) of the production tree (100). The tubular body (204) is formed by the upper master valve (112), the crown valve (110), and any spools/equipment connecting the crown valve (110) to the upper master valve (112).

The pressure control system (300) is disposed around the rod (212) of the tool (200). The pressure control system (300) is made of a pressure control body (302). The pressure control body (302) may be a singular tubular structure, or a plurality of tubular structures connected together. Further, the pressure control body (302) may be capped by a bearing (304), as shown in FIG. 3. The rod (212) may be moveable within the pressure control body (302), and the rod (212) may extend through the bearing (304) to be connected to a fluid source, not pictured, and electronic control equipment, such as a computer processor and/or viewing device, not pictured.

The pressure control body (302) may be made out of the same material as the production tree (100) and may have the same pressure rating as the production tree (100). The pressure control body (302) is connected to the tubular body (204) of the production tree (100) by any form of connection known in the art, such as a bolted flange-flange connection. The orifice (208) of the tubular body (204) may extend from the tubular body (204) into the pressure control system (300) and may be re-defined by the inner surface (306) of the pressure control body (302).

In accordance with one or more embodiments, the nozzle (222), camera (224), and magnet (228) of the tool (200) are disposed near the barrier (210) in the tubular body (204). The tool (200) includes two centralizers (230), one centralizer (230) is located within the tubular body (204) and the second centralizer (230) is located in the pressure control body (302). The anchor (232) is also located in the pressure control body (302).

The inner surface (306) of the pressure control body (302) may be machined with a threaded portion (318). The threaded portion (318) is a progressive depression that runs circumferentially around the entire inner surface (306). Further, the threaded portion (318) may be located on the pressure control body (302) at a location that is designed to aid in correctly placing the nozzle (222) at the predetermined distance from the barrier (210) and facilitate the 360-degree rotation of the nozzle (222) when cutting the barrier (210). The anchor (232) may include anchor teeth (320). When the anchor (232) is protruded from the rod (212), the anchor teeth (320) may enter into the threaded portion (318) of the inner surface (306), such that, when the rod (212) rotates, the anchor (232) is able to hold the tool (200) in place while simultaneously rotating about the rod axis (216).

The pressure control system (300) includes a first motor (308) and a second motor (310) connected to the rod (212) in the pressure control body (302). In further embodiments, the first motor (308) moves the rod (212) in a direction parallel to the rod axis (216) and the second motor (310) rotates the rod (212) about the rod axis (216). The pressure control system (300) further includes at least one packing gland. A packing gland is a device that seal around a reciprocating or a rotating shaft, i.e., the rod (212).

In accordance with one or more embodiment, a first packing gland (312) and a second packing gland (314) are located between the pressure control body (302) and the rod (212). The first packing gland (312) and the second packing gland (314) are made of a malleable packing compound that is forced into the orifice (208) of the pressure control body (302) by an adjustable packing nut, or similar arrangement, in order for the first packing gland (312) and the second packing gland (314) to seal around the rod (212). The first packing gland (312) and the second packing gland (314) prevent fluids from migrating up hole between the production tree (100) and the pressure control body (302).

An inlet (316) is physically connected to the pressure control body, downhole from the first packing gland (312) and the second packing gland (314). The inlet (316) is also hydraulically connected to the orifice (208) of the tubular body (204) such that a fluid may be pumped into the orifice (208) to manage pressure while the barrier (210) is being cut by the tool (200).

In accordance with one or more embodiments, the rod (212) may be made of four different portions, or four different bottom hole assemblies (BHAs), connected together. The first portion of the rod (212) includes the upper most section of the rod (212) to the section just above the anchor (232). The second portion includes the anchor (232). The third portion includes the section of the rod (212) from just below the anchor (232) to the section of the rod (212) just above the nozzle (222) and includes the centralizers (230). The fourth portion includes the nozzle (222), camera (224), and magnet (228).

Figure 4:
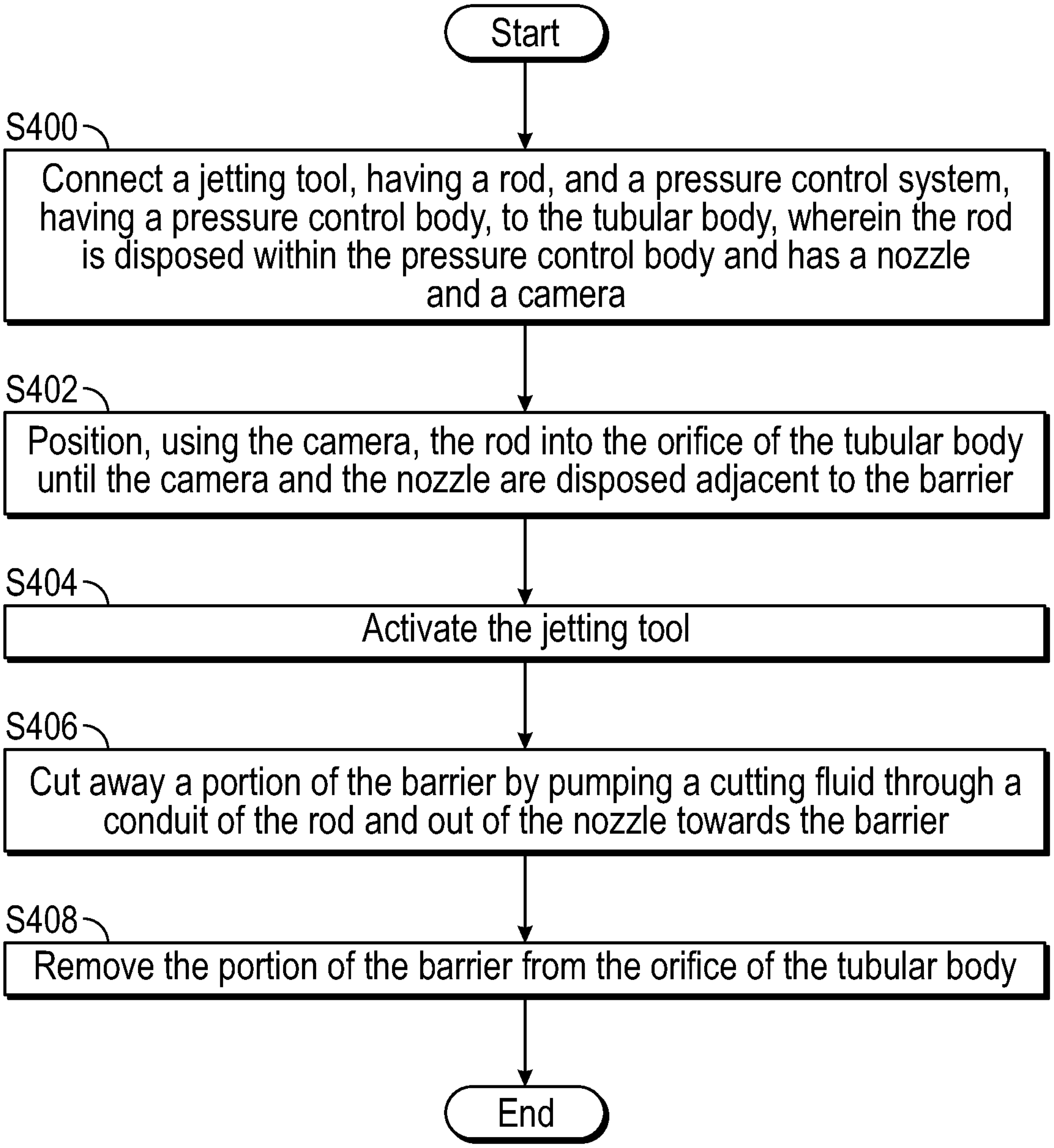
FIG. 4 shows a flowchart in accordance with one or more embodiments.

FIG. 4 shows a flowchart in accordance with one or more embodiments. The flowchart outlines a method for removing a barrier (210) disposed within an orifice (208) of a tubular body (204). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a jetting tool (200), having a rod (212), and a pressure control system (300), having a pressure control body (302), is connected to the tubular body (204), wherein the rod (212) is disposed within the pressure control body (302) and has a nozzle (222) and a camera (224) (S400). The tubular body (204) may be part of a production tree (100), as described in FIG. 1. The production tree (100) may have a stuck valve (202). The stuck valve (202) may be the upper master valve (112) or the lower master valve (114).

Prior to installation of the jetting tool (200) and the pressure control system (300) to the production tree (100), the well (104) may be analyzed to ensure adequate isolation barriers are in place. Further, the crown valve (110), wing valves (116), and other production tree (100) and wellhead (102) accessories are tested per testing procedures and holding. In accordance with one or more embodiments, the jetting tool (200) and the pressure control system (300) are installed onto the crown valve (110) using a bolted flange-flange connection. A kill line, circulation line, and all electrical connections are made to the production tree (100), jetting tool (200), and pressure control system (300).

The jetting tool (200) and the pressure control system (300) are hydrotested and function tested using high and low pressure hydrotest. The crown valve (110) is opened, and the rod (212) is positioned, using the camera (224), into the orifice (208) of the tubular body (204) until the camera (224) and the nozzle (222) are disposed adjacent to the barrier (210) (S402). The rod (212) is positioned by moving the rod (212) along a rod axis (216) using a first motor (308) connected to the rod (212). The rod (212) is kept in the center of the orifice (208) using one or more centralizers (230) disposed around the rod (212). Once the jetting tool (200) is disposed near the barrier (210), the jetting tool (200) is activated (S404).

Activating the jetting tool (200) includes activating the anchor (232), or, in other words, placing the anchor (232) in a deployed position. The anchor (232) is activated/deployed to protrude the anchor (232) from the rod (212) to grip an inner wall (206) of the tubular body (204) or an inner surface (306) of the pressure control body (302). Activating the jetting tool (200) also includes protruding the nozzle (222) and the camera (224) away from the rod (212).

The jetting tool (200) may be activated by sending a signal from a computer processor to the tool (200). This may be done wirelessly or with a wire. Further, the movement of the rod (212) by the first motor (308) may be controlled using a computer processor having a screen streaming the camera (224) output. A portion of the barrier (210) is cut away by pumping a cutting fluid through a conduit (214) of the rod (212) and out of the nozzle (222) towards the barrier (210) (S406).

In accordance with one or more embodiments, the barrier (210) is cut away by rotating the nozzle (222), after being protruded, about a rod axis (216) using a second motor (310) connected to the rod (212). The nozzle (222) may be rotated a full 360 degrees to completely cut away a portion of the barrier (210). Further, the camera (224) may continue to film the cutting process such that the operation may be monitored, and the speed of the rotation and the pressure of the fluid may be controlled based on the efficiency of the barrier (210) being cut.

As the barrier (210) is being cut, a cooling fluid, such as water, may be circulated into the orifice (208) to cool the system and circulate out cuttings. Specifically, the cooling fluid may be pumped into the orifice (208) using the inlet (316) and the cooling fluid and cuttings may exit the system using one of the wing valves (116). The cooling fluid and the cutting fluid are prevented from migrating up hole using the first packing gland (312) and the second packing gland (314) located between the rod (212) and the pressure control system (300).

A portion of the barrier (210) is removed from the orifice (208) of the tubular body (204) (S408). In accordance with one or more embodiments, after about 80 percent of the portion of the barrier (210) is cut away, the jetting tool (200) may be lowered such that the magnet (228) touches the portion of the barrier (210). The magnet (228) may be activated to attract the portion of the barrier (210) to the rod (212), and the remainder of the portion of the barrier (210) may be cut away using the nozzle (222). The first motor (308) may then pull the rod (212) and the cut portion of the barrier (210) out of the orifice (208) of the tubular body (204).

During the cutting and removing operation, the pressure control system (300) is kept pressurized to avoid any well control issues. The pressure control system (300) may be pressurized (and tested) using a hydraulic unit connected to the first packing gland (312) and the second packing gland (314). Once the jetting tool (200) and the cut portion of the barrier (210) are out of the production tree (100) and are located within the pressure control body (302), a kill fluid may be pumped into the well (104) using one of the wing valves (116). Once the well is killed, the crown valve (110), and any other secondary valves, may be closed and the jetting tool (200) and the pressure control system (300) may be removed from the production tree (100).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for removing a portion of a barrier disposed within an orifice, the orifice defined by an inner wall of a tubular body, the system comprising:

a rod having a conduit extending along a rod axis from a first end of the rod to a second end of the rod, the second end of the rod disposed adjacent to the barrier within the orifice;

a nozzle connected to the second end of the rod and in hydraulic communication with the conduit and the orifice;

a camera connected to the second end of the rod, wherein the nozzle and the camera are configured to protrude from the rod and rotate about the rod axis; and a pressure control system connected to the tubular body and disposed around the rod, wherein the nozzle is configured to cut away the portion of the barrier upon pumping of a cutting fluid through a conduit of the rod and out of the nozzle towards the barrier, wherein a pressure of the cutting fluid is configured to be adjusted to a pressure required for the cutting fluid to cut away the portion of the barrier using the pressure control system, and wherein the portion of the barrier is removable from the orifice of the tubular body once cut away.

2. The system of claim 1, further comprising a centralizer disposed around the rod, the centralizer touching the inner wall of the tubular body to hold the rod in a central position within the orifice.

3. The system of claim 1, further comprising an anchor, connected to the rod, having a retracted position and a deployed position.

4. The system of claim 3, wherein the deployed position comprises the anchor protruding from the rod to grip the inner wall of the tubular body or into an inner surface of the pressure control system.

5. The system of claim 1, further comprising a magnet connected to the second end of the rod.

6. The system of claim 1, wherein the pressure control system further comprises a first motor and a second motor connected to the rod.

7. The system of claim 6, wherein the first motor moves the rod in a direction parallel to the rod axis and the second motor rotates the nozzle and the camera about the rod axis.

8. The system of claim 1, wherein the pressure control system further comprises a pressure control body connected to the tubular body.

9. The system of claim 8, wherein the pressure control system further comprises a packing gland located between the pressure control body and the rod.

10. The system of claim 9, wherein the pressure control system further comprises an inlet physically connected to the pressure control body, downhole from the packing gland, and hydraulically connected to the orifice of the tubular body.

11. A method for removing a portion of a barrier disposed within an orifice of a tubular body, the method comprising:

connecting a jetting tool, having a rod, and a pressure control system, having a pressure control body, to the tubular body, wherein the rod is disposed within the pressure control body and has a nozzle and a camera;

positioning, using the camera, the rod into the orifice of the tubular body until the camera and the nozzle are disposed adjacent to the barrier;

activating the jetting tool;

cutting away the portion of the barrier by pumping a cutting fluid through a conduit of the rod and out of the nozzle towards the barrier, wherein a pressure of the cutting fluid is adjusted to a pressure required for the cutting fluid to cut away the portion of the barrier using the pressure control system; and removing the portion of the barrier from the orifice of the tubular body.

12. The method of claim 11, wherein positioning the rod into the orifice of the tubular body further comprises moving the rod along a rod axis using a first motor connected to the rod.

13. The method of claim 11, wherein positioning the rod into the orifice of the tubular body further comprises centering the rod within the orifice using a centralizer.

14. The method of claim 11, wherein activating the jetting tool further comprises activating an anchor disposed around the rod.

15. The method of claim 14, wherein activating the anchor comprises protruding the anchor from the rod to grip an inner wall of the tubular body or into an inner surface of the pressure control body.

16. The method of claim 11, wherein activating the jetting tool further comprises protruding the nozzle and the camera away from the rod.

17. The method of claim 16, wherein cutting away the barrier further comprises rotating the nozzle, after being protruded, about a rod axis using a second motor connected to the rod.

18. The method of claim 11, wherein removing the portion of the barrier from the orifice of the tubular body further comprises pumping a cooling fluid into the orifice of the tubular body using an inlet connected to the pressure control system.

19. The method of claim 18, wherein removing the portion of the barrier from the orifice of the tubular body further comprises preventing the cooling fluid and the cutting fluid from migrating up hole using a packing gland located between the rod and the pressure control system.

20. The method of claim 11, wherein removing the portion of the barrier from the orifice of the tubular body further comprises attracting the portion of the barrier to the rod using a magnet connected to the rod.

* * * * *